United States Patent
Jakobsson et al.

(10) Patent No.: US 11,845,430 B2
(45) Date of Patent: Dec. 19, 2023

(54) METHOD AND AN APPARATUS FOR CONTROLLING DRIVING POWER IN A MOTOR VEHICLE

(71) Applicant: Scania CV AB, Södertälje (SE)

(72) Inventors: Martin Jakobsson, Hägersten (SE); Susanna Jacobsson, Huddinge (SE); Victor Lindroth, Handen (SE); Mikael Öun, Norsborg (SE)

(73) Assignee: Scania CV AB, Södertälje (SE)

( * ) Notice: Subject to any disclaimer, the term of this patent is extended or adjusted under 35 U.S.C. 154(b) by 647 days.

(21) Appl. No.: 16/966,505

(22) PCT Filed: Jan. 28, 2019

(86) PCT No.: PCT/SE2019/050056
§ 371 (c)(1),
(2) Date: Jul. 31, 2020

(87) PCT Pub. No.: WO2019/156608
PCT Pub. Date: Aug. 15, 2019

(65) Prior Publication Data
US 2021/0039640 A1 Feb. 11, 2021

(30) Foreign Application Priority Data
Feb. 7, 2018 (SE) .................... 1850136-1

(51) Int. Cl.
*B60W 30/14* (2006.01)
(52) U.S. Cl.
CPC ....... *B60W 30/146* (2013.01); *B60W 2520/10* (2013.01)

(58) Field of Classification Search
CPC ........... B60W 30/146; B60W 2520/10; B60W 50/10; B60W 2540/103; F16H 61/16; F16H 59/20; F16H 2061/0244
See application file for complete search history.

(56) References Cited

U.S. PATENT DOCUMENTS

| 2004/0049333 A1 | 3/2004 | Kustosch et al. |
| 2004/0182620 A1 | 9/2004 | Dornhausen |

(Continued)

FOREIGN PATENT DOCUMENTS

| DE | 102009045512 A1 | 4/2011 |
| DE | 102011113909 A1 | 3/2012 |

(Continued)

OTHER PUBLICATIONS

English Translation: Braennstroem, SE 533766 C2, Dec. 2010, Swedish Patent Office Publication (Year: 2010).*

(Continued)

*Primary Examiner* — Nadeem Odeh
(74) *Attorney, Agent, or Firm* — Moore & Van Allen PLLC; W. Kevin Ransom

(57) ABSTRACT

A method and an apparatus for controlling driving power from a powertrain of a motor vehicle comprising a kickdown switch, wherein an activation of the kickdown switch triggers a default action of temporarily requesting an increase of a maximum power available from the powertrain, the method comprising: recognizing that a speed limiter, setting an upper speed limit for the vehicle speed, is active, comparing a current vehicle speed to a predefined speed threshold, which is below the upper speed limit, and if the current vehicle speed is above the speed threshold and the speed limiter is active, triggering an altered action in response to the activation of the kickdown switch.

11 Claims, 3 Drawing Sheets

(56) References Cited

U.S. PATENT DOCUMENTS

| | | | |
|---|---|---|---|
| 2012/0166053 A1 | 6/2012 | Nishida et al. | |
| 2012/0191312 A1 | 7/2012 | Kimura | |
| 2013/0225367 A1* | 8/2013 | Dietzel | B60W 20/19 |
| | | | 477/97 |
| 2017/0072952 A1 | 3/2017 | Sim | |
| 2017/0291604 A1 | 10/2017 | Mukkala et al. | |
| 2019/0031196 A1* | 1/2019 | Kim | B60W 30/16 |

FOREIGN PATENT DOCUMENTS

| | | | |
|---|---|---|---|
| EP | 0780601 A1 | 6/1997 | |
| EP | 1420194 A2 | 5/2004 | |
| EP | 1925487 A2 | 5/2008 | |
| EP | 1939060 A1 | 7/2008 | |
| EP | 2065281 A1 | 6/2009 | |
| EP | 2319723 A1 | 5/2011 | |
| JP | 2008202678 A | 9/2008 | |
| SE | 533766 C2 * | 12/2010 | B60K 31/047 |

OTHER PUBLICATIONS

Scania CV AB, International Application No. PCT/SE2019/050056, International Search Report, dated Mar. 7, 2019.

Scania CV AB, International Application No. PCT/SE2019/050056, Written Opinion, dated Mar. 7, 2019.

Scania CV AB, Swedish Application No. 1850136-1, Office Action, dated Aug. 24, 2018.

Scania CV AB, Swedish Application No. 1850136-1, Office Action, dated Mar. 8, 2019.

Scania CV AB, International Application No. PCT/SE2019/050056, International Preliminary Report on Patentability, dated Aug. 11, 2020.

Scania CV AB, European Patent Application No. 19751665.1, Extended European Search Report, dated Jul. 28, 2021.

Scania CV AB, Chinese Patent Application No. 201980010465.6, First Office Action, date Mar. 30, 2021.

* cited by examiner

METHOD AND AN APPARATUS FOR CONTROLLING DRIVING POWER IN A MOTOR VEHICLE

CROSS-REFERENCE TO RELATED APPLICATIONS

This application is a national stage application (filed under 35 § U.S.C. 371) of PCT/SE2019/050056, filed Jan. 28, 2019 of the same title, which, in turn, claims priority to Swedish Application No 1850136-1 filed Feb. 7, 2018; the contents of each of which are hereby incorporated by reference.

FIELD OF THE INVENTION

The present invention relates to a method and an apparatus for controlling driving power from a powertrain of a motor vehicle. The invention also relates to a computer program, a computer-readable medium and a motor vehicle.

BACKGROUND OF THE INVENTION

Many motor vehicles are equipped with a kickdown switch for allowing the driver to temporarily request an increase of a maximum power available from a powertrain of the motor vehicle, in particular if the motor vehicle has an automatic transmission, or a manual gearbox operated automatically (automated manual transmission). The kickdown switch is typically activated by depressing the accelerator pedal past 100%, which requires some extra force, or by quickly depressing the accelerator pedal. The activation of the kickdown switch may lead to a shift to a lower gear and thus higher engine speed, a temporary increase of the engine's torque limit, or the connection of an additional power source, such as an electric motor. During overtaking and in similar situations, the motor vehicle can thus be accelerated faster thanks to the increase in maximum power.

However, when the vehicle speed is limited by a speed limiter setting an upper limit for the vehicle speed, the vehicle speed is not allowed to be increased above the upper speed limit. If driving at a speed close to the upper speed limit, an an increase of the maximum power available from the powertrain does not lead to an increased vehicle speed, but merely to additional noise and a reduced fuel efficiency. The use of a speed limiter is in many jurisdictions mandatory in heavy goods vehicles (HGVs) such as buses and trucks. For example, in the European Union, speed limiters are compulsory for HGVs of 3,500 kg and more and for buses of 10,000 kg or more. The upper speed limit, which is a maximum allowable speed limit, is typically 80 km/h or 90 km/h, is set based on vehicle type and legislative considerations.

Speed limiters may also be used to maintain the vehicle speed below a local speed limit valid for the particular road on which the motor vehicle is travelling. Recent and upcoming standards and legislations introduce geographical zones in which vehicle speed and emissions are restricted, such as in urban areas and outside schools. The local speed limit may in such areas be significantly lower than the maximum allowable speed limit mentioned above, such as e.g. 30 km/h.

SUMMARY OF THE INVENTION

It would be desirable to achieve an in at least some aspect improved method and apparatus for controlling driving power from a powertrain of a motor vehicle. In particular, it would be advantageous to provide such a method and apparatus which are useful when a vehicle speed of the motor vehicle is limited by a speed limiter. It would be particularly advantageous to provide a method and an apparatus that help avoiding requests for increased maximum power available from the powertrain in situations in which such an increase would not be useful.

To better address these concerns, a method and an apparatus as defined in the independent claims are provided.

According to one aspect, a method for controlling driving power from a powertrain of a motor vehicle is provided. The motor vehicle comprises a kickdown switch and wherein the motor vehicle is configured so that an activation of the kickdown switch triggers a default action, the default action comprising temporarily requesting an increase of a maximum power available from the powertrain. The method comprises:

recognizing that a speed limiter, setting an upper speed limit for the vehicle speed, is active,
 comparing a current vehicle speed to a predefined speed threshold, which speed threshold is below the upper speed limit, and
 if the current vehicle speed is above the speed threshold and the speed limiter is active, triggering an altered action in response to the activation of the kickdown switch.

According to another aspect, an apparatus for controlling driving power from a powertrain of a motor vehicle is provided. The motor vehicle comprises a kickdown switch and the motor vehicle is configured so that an activation of the kickdown switch triggers a default action, the default action comprising temporarily requesting an increase of a maximum power available from the powertrain. The apparatus is configured to:

recognize that a speed limiter, setting an upper speed limit for the vehicle speed, is active,
 compare a current vehicle speed to a predefined speed threshold, which speed threshold is below the upper speed limit, and
 if the current vehicle speed is above the speed threshold and the speed limiter is active, trigger an altered action in response to the activation of the kickdown switch.

The method and the apparatus have several advantages. By the method and the apparatus according to the invention, it is possible to alter the action taken in response to an activation of the kickdown switch if the vehicle speed is close to an upper speed limit set by the speed limiter. Thereby, the default action of requesting an increase of a maximum power available from the powertrain may be avoided if this is not considered to be desirable, e.g. because the increase of the maximum power available from the powertrain cannot be used to increase the vehicle speed above the upper speed limit and will therefore merely result in increased noise and emission levels. Furthermore, the altered action, which differs in at least some way from the default action and which is triggered instead of the default action, may be tailored to suit the demands on the particular motor vehicle.

In particular, but not exclusively, the method and the apparatus according to the invention are suitable for use in a heavy goods vehicle, such as a truck or a bus.

Preferred embodiments of the invention are disclosed in the dependent claims.

It will be appreciated that all the embodiments described with reference to the method aspect of the present invention are applicable also for the apparatus aspect of the present invention. That is, the apparatus may be configured to perform any one of the method steps of the described embodiments.

Other advantageous features as well as advantages of embodiments of the present invention will appear from the following description.

BRIEF DESCRIPTION OF THE DRAWINGS

Embodiments of the invention will in the following be further described by means of example with reference to the appended drawings, wherein FIG. 1 schematically shows a simplified motor vehicle according to an embodiment of the invention.

DETAILED DESCRIPTION OF EMBODIMENTS OF THE INVENTION

Definitions

By a motor vehicle is herein intended a motor vehicle which is powered by an internal combustion engine and/or by an electric motor.

A speed limiter is herein to be understood as comprising one or more devices configured to control the vehicle speed by limiting the power delivered from a powertrain of the motor vehicle in such a way that the vehicle speed cannot be increased above a currently effective upper speed limit.

A motor vehicle may be equipped with several such devices, wherein a different upper speed limit may be set for each device. It may also be equipped with a single device for which one or more upper speed limit(s) may be defined. When the speed limiter is active, a driver cannot use e.g. an accelerator pedal to increase the vehicle speed above the upper speed limit.

A kickdown switch is herein to be understood as a switch that may be controlled by a driver of the motor vehicle in order to request an increase of a maximum power available from a powertrain of the motor vehicle. The kickdown switch may be activated in various ways, e.g. by depressing a button, by depressing the accelerator pedal by more than a preset amount (e.g. past a point of resistance) or at a depressing speed higher than a preset depressing speed. When the kickdown switch is activated, the available power is increased so that the motor vehicle may e.g. be accelerated faster.

Figure 1:
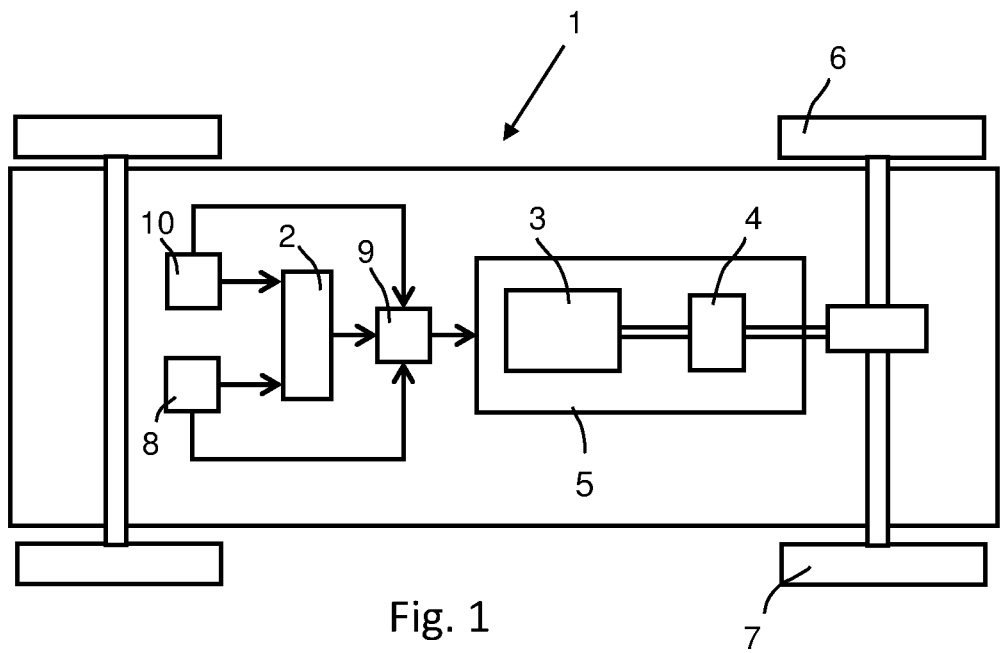

A motor vehicle 1, in which an apparatus 2 for controlling driving power according to an embodiment of the invention is provided, is schematically illustrated in FIG. 1. The motor vehicle 1 comprises an internal combustion engine 3 and a transmission 4 that form part of a powertrain 5 configured to drive driving wheels 6, 7 of the motor vehicle 1. The transmission 4 may be an automatic transmission, but it may also be a manual transmission or an automated manual transmission. A kickdown switch 8, which may be activated by a driver of the motor vehicle 1, is also provided. The kickdown switch 8 is configured so that an activation thereof triggers a default action of temporarily requesting an increase of the maximum power available from the powertrain 5. The kickdown switch 8 is for this purpose configured to generate signals that are sent, either wirelessly or by means of a wire connection, to a control device 9 controlling the powertrain 5. The kickdown switch 8 may e.g. be activated by strongly depressing an accelerator pedal (not shown) of the motor vehicle 1 such that the pressed amount is at least equal to a preset value. The kickdown switch may also be provided separately from the accelerator pedal.

The motor vehicle 1 further comprises a speed limiter 10 setting an upper speed limit $v_{lim}$ for the vehicle speed v. The speed limiter 10 has a preset maximum allowable speed limit, which is set in dependence on vehicle type and legislative considerations. The speed limiter 10 is further configured to recognize a currently effective speed limit, which may be set as the upper speed limit for the vehicle speed if the currently effective speed limit is lower than the maximum allowable speed limit. The currently effective speed limit may be sensed by a sensing unit (not shown) within the motor vehicle 1, for example by reading a speed limit sign using a camera, or be communicated to and received in a communication unit (not shown) in the motor vehicle 1. Digital maps in combination with positioning information, e.g. global positioning system (GPS) data can also be used to obtain information about speed limits.

The kickdown switch 8 and the speed limiter 10 are both configured to communicate with the apparatus 2, either wirelessly or by means of wired connections. The communication may be directly between the units, but it may also be via intermediate units (not shown) within the motor vehicle 1.

Figure 2:
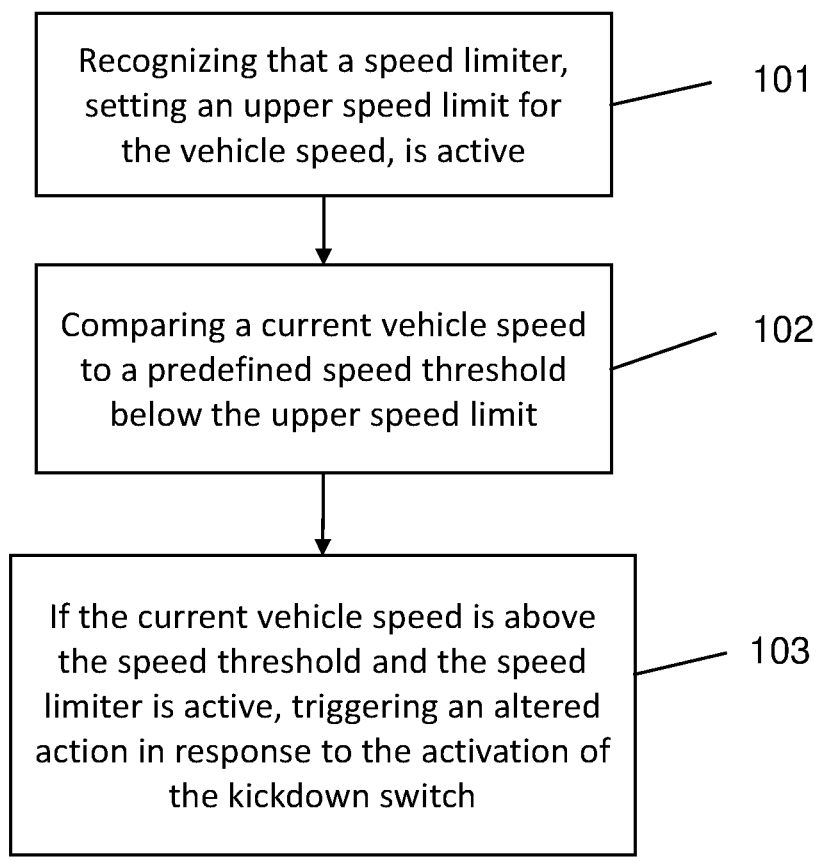
FIG. 2 is a flow chart showing a method according to an embodiment of the invention.

A method according to an embodiment of the invention, carried out e.g. in the motor vehicle 1 illustrated in FIG. 1, is schematically illustrated in the flow chart of FIG. 2.

In a first step 101, it is recognized that the speed limiter 10 is active. This may be recognized by receiving a signal in the apparatus 2, stating that the speed limiter 10 is active and sets an upper speed limit $v_{lim}$ for the vehicle speed v which may not be exceeded. The currently effective upper speed limit $v_{lim}$ set by the speed limiter 10 may also be communicated to and received in the apparatus 2.

In a second step 102, a current vehicle speed $v_0$ is compared to a predefined speed threshold $v_{th}$, which speed threshold $v_{th}$ is below the upper speed limit $v_{lim}$, i.e. the currently effective upper speed limit $v_{lim}$ set by the speed limiter 10. The current vehicle speed $v_0$ of the motor vehicle 1 may be sensed or otherwise determined.

In a third step 103, if the current vehicle speed $v_0$ is above the speed threshold $v_{th}$ and the speed limiter 10 is active, an altered action is triggered in response to the activation of the kickdown switch 8, which altered action is in at least some way different from the default action. If the current vehicle speed $v_0$ is below the speed threshold $v_{th}$, the activation of the kickdown switch 8 triggers the default action of requesting an increase of the maximum power available from the powertrain, e.g. by shifting to a lower gear and thus a higher engine speed, by temporarily increasing the torque limit of the engine 3, by changing the engine operating mode so that torque/power is prioritized, or, if available, by connecting an additional power source, such as an electric motor.

Figure 3:
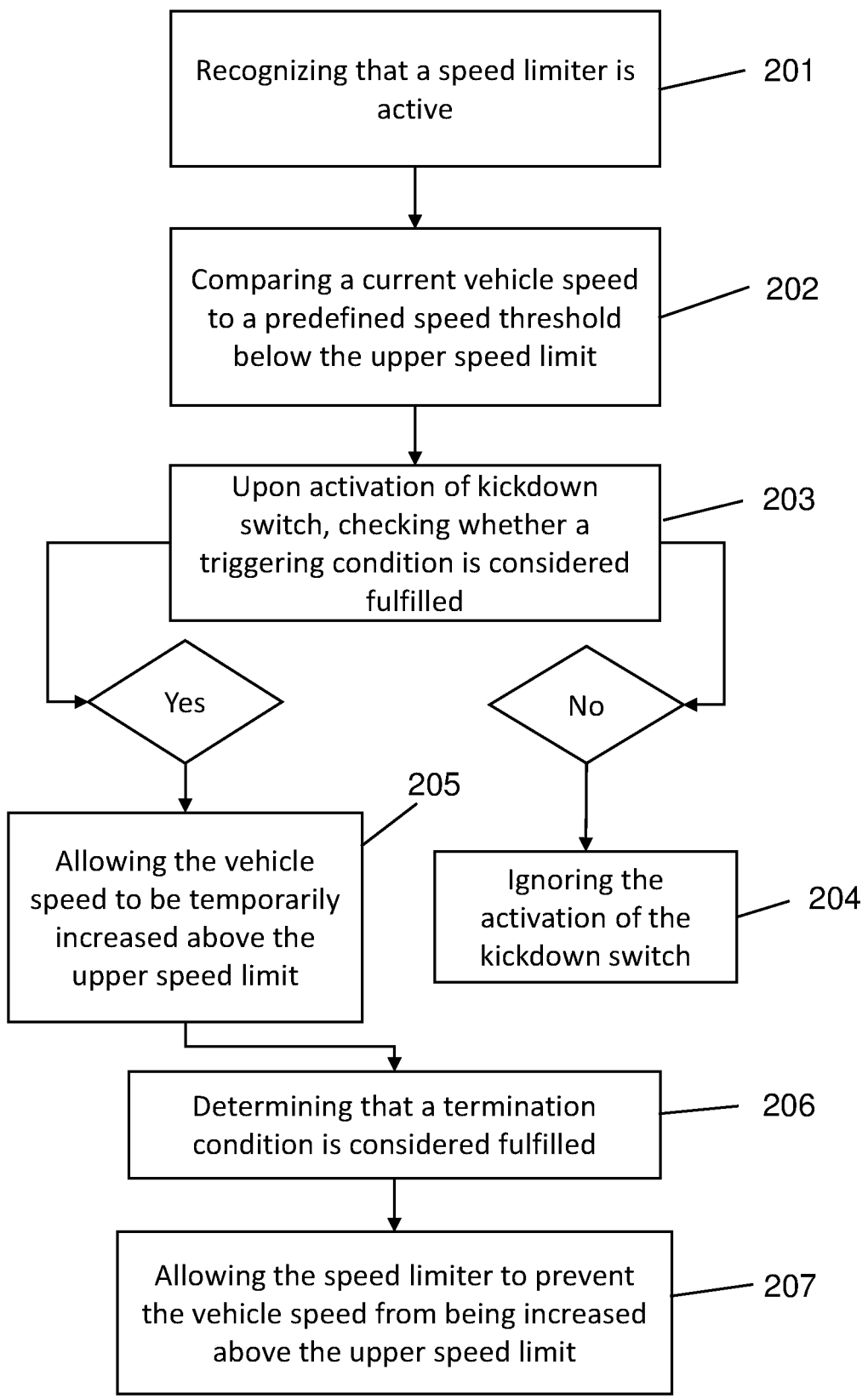
FIG. 3 is a flow chart showing a method according to another embodiment of the invention, and FIG. 4 schematically shows a control unit for carrying out the method according to an embodiment of the invention.

The altered action may be determined based on whether a triggering condition is considered fulfilled. Different altered actions may be carried out depending on whether the triggering condition is considered fulfilled or not. In FIG. 3, a method according to an embodiment of the invention is illustrated in which a triggering condition has been defined. According to this embodiment, a step 201 of recognizing that the speed limiter 10 is active and a step 202 of comparing a current vehicle speed to a predefined speed threshold below the upper speed limit are carried out as explained with reference to FIG. 2. Upon activation of the kickdown switch 8, it is in a step 203 checked whether the triggering condition is fulfilled. If the triggering condition is defined so that the driver can actively choose to fulfil it, the driver can easily select which altered action should be taken upon activation of the kickdown switch 8. It is also possible to define more than one triggering condition, so that the altered action may differ depending on which triggering condition(s) is/are considered fulfilled.

If the triggering condition is not considered fulfilled, the altered action may comprise, in a step 204, ignoring the activation of the kickdown switch 8. Thus, no request for an increase of the maximum power available from the powertrain is made, or such a request is ignored, unless the triggering condition is considered fulfilled. Situations in which an increased maximum power is made available although it cannot be used may thereby more easily be avoided. Furthermore, accidental requests for an increase of the maximum power available from the powertrain, e.g. by an accidental depression of the kickdown switch as the motor vehicle travels over a speed bump or similar, are avoided.

If the triggering condition is considered fulfilled, the altered action may comprise, in a step 205, allowing the vehicle speed v to be temporarily increased above the upper speed limit $v_{lim}$. This may be useful for example for an emergency vehicle travelling in a low speed zone in which the speed limiter 10 sets a relatively low upper speed limit $v_{lim}$. The driver can, by making sure that the triggering condition is fulfilled, increase the vehicle speed v above the upper speed limit $v_{lim}$ if necessary, e.g. if on an emergency call. In this case, the altered action may also include requesting an increase of the maximum power available from the powertrain to be able to quickly accelerate. The triggering condition may be set so as to prevent the driver from accidentally triggering the altered action of increasing the vehicle speed v above the upper speed limit $v_{lim}$ thereby avoiding unnecessary incidence reports generated as a result of violations of the upper speed limit $v_{lim}$.

The triggering condition may be defined so that it is considered fulfilled upon receipt of a defined signal generated on an initiative of a driver of the motor vehicle 1. This allows the driver to signal when it is desired to e.g. override the upper speed limit $v_{lim}$. For example, the triggering condition may be defined so that it is considered fulfilled if one of the following is satisfied: the kickdown switch 8 is depressed for at least a preset time, the kickdown switch is depressed with at least a preset force, and the kickdown switch is depressed at least a preset number of times during a preset time interval. The triggering condition may e.g. be defined so that it is considered fulfilled if the kickdown switch 8 is depressed for at least two (2) or three (3) seconds, or if the kickdown switch 8 is depressed at least three times during a two seconds time interval.

Allowing the vehicle speed v to be temporarily increased above the upper speed limit $v_{lim}$ may comprise temporarily overriding the speed limiter 10. This may be preferable to temporarily deactivating the speed limiter 10, since it is desirable to keep the speed limiter 10 active with respect to a higher speed limit, such as a maximum allowable speed limit $v_{max}$ set based on vehicle type.

Given that a termination condition is considered fulfilled, the speed limiter 10 may be allowed to prevent the vehicle speed v from being increased above the upper speed limit $v_{lim}$. Thus, a termination condition is defined, and as it is in a step 206 determined that the termination condition is considered fulfilled, the vehicle speed v is once again delimited by the upper speed limit $v_{lim}$ set by the speed limiter 10. For example, the termination condition may be defined so that it is considered fulfilled once the vehicle speed v drops below the upper speed limit $v_{lim}$ and is at the same time at least a defined amount lower than a maximum vehicle speed reached while the vehicle speed v was allowed to be increased above the upper speed limit $v_{lim}$. The defined amount may e.g. be 2 km/h. The termination condition may also be defined so that it is considered fulfilled once a predefined signal is received from a driver of the motor vehicle 1.

The upper speed limit $v_{lim}$ may be below a maximum allowable speed limit $v_{max}$ of the speed limiter 10, which maximum allowable speed limit $v_{max}$ is set based on vehicle type. For example, the maximum allowable speed limit $v_{max}$ for a heavy goods vehicle may be 80-90 km/h, depending on legislative considerations. The upper speed limit $v_{lim}$ may be a speed limit valid on a particular road on which the motor vehicle 1 travels or in a particular geographical zone. The upper speed limit $v_{lim}$ may be a relatively low speed limit of an urban area or outside a school, e.g. 30-50 km/h, which is well below the maximum allowable speed limit $v_{max}$.

A triggering condition may be defined that is considered fulfilled if the upper speed limit $v_{lim}$ is below the maximum allowable speed limit $v_{max}$ of the speed limiter 10. In this case, if the upper speed limit $v_{lim}$ corresponds to the maximum allowable speed limit $v_{max}$ and the triggering condition is consequently not considered to be fulfilled, the altered action may comprise, in the step 204, ignoring the activation of the kickdown switch 8 since the vehicle speed v may never be increased above the maximum allowable speed limit $v_{max}$. If the triggering condition is considered fulfilled, it may be checked whether another triggering condition is fulfilled, e.g. whether the kickdown switch 8 is activated for at least a preset time. If only one of the triggering conditions is fulfilled, the activation of the kickdown switch 8 is ignored.

The speed threshold $v_{th}$ may be set in dependence on the upper speed limit $v_{lim}$ for example to a value differing by a certain percentage from the upper speed limit $v_{lim}$ or to a tabulated value. Setting a relevant speed threshold $v_{th}$ is thereby facilitated.

A difference between the upper speed limit $v_{lim}$ and the speed threshold $v_{th}$ may be less than 10 km/h, or less than 5 km/h.

One skilled in the art will appreciate that a method according to embodiments of the present invention may be implemented in a computer program which, when executed in a computer, causes the computer to conduct the method. The computer program usually takes the form of a computer program product which comprises a suitable digital storage medium on which the computer program is stored. Said computer-readable digital storage medium comprises a suitable memory, e.g. ROM (read-only memory), PROM (programmable read-only memory), EPROM (erasable PROM), flash memory, EEPROM (electrically erasable PROM), a hard disc unit, etc.

Figure 4:
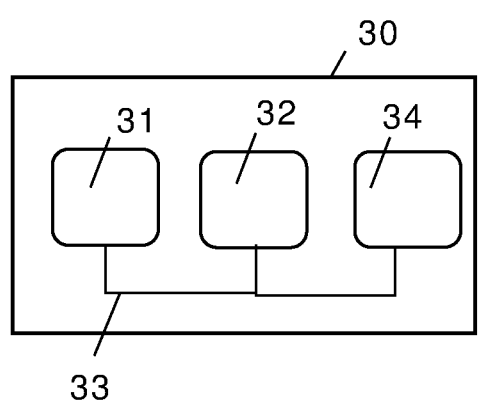

The apparatus 2 according to the invention may comprise one electronic control unit or two or more cooperating electronic control units. FIG. 4 illustrates very schematically such an electronic control unit 30 forming part of an apparatus 2 according to an embodiment of the invention. The control unit 30 comprises an execution means 31, such as a central processing unit (CPU), for executing a computer program. The execution means 31 communicates with a memory 32, for example of the type RAM, through a data bus 33. The control unit 30 comprises also a non-transitory data storing medium 34, for example in the form of a Flash memory or a memory of the type ROM, PROM, EPROM or EEPROM. The execution means 31 communicates with the data storing medium 34 through the data bus 33. A computer program comprising computer program code for implementing a method according to an embodiment of the invention is stored on the data storing medium 34.

EXAMPLE

An emergency vehicle is driving in a geographical zone with a speed restriction of 50 km/h. The emergency vehicle is equipped with a speed limiter setting a currently effective upper speed limit $v_{lim}$ of 50 km/h. The emergency vehicle is further equipped with a kickdown switch that may be activated by depressing the accelerator pedal fully, which requires some additional force. A speed threshold $v_{th}$ of 47 km/h is defined, above which an altered action is triggered in response to the activation of the kickdown switch when the speed limiter is active and sets the upper speed limit $v_{lim}$ of 50 km/h. A first triggering condition is defined, which first triggering condition is considered fulfilled if the upper speed limit $v_{lim}$ is below the maximum allowable speed limit $v_{max}$ of the speed limiter. A second triggering condition is further defined, which second triggering condition is considered fulfilled if the driver depresses the accelerator pedal fully, thereby activating the kickdown switch, for at least three seconds.

After rounding a corner, the driver of the emergency vehicle wants to accelerate the vehicle from a vehicle speed well below 50 km/h. The driver depresses the accelerator pedal fully and activates the kickdown switch, thereby requesting an increase of the maximum power available from the powertrain. Since the vehicle speed is below the speed threshold $v_{th}$, a gear shift to a lower gear and thus higher engine speed is initiated as a result of the request, thereby allowing faster acceleration. There is no need for the driver to activate the kickdown switch during at least three seconds in this situation.

The emergency vehicle is travelling at a vehicle speed of 49 km/h, when it hits a bump in the road and the driver accidentally depresses the accelerator pedal fully, activating the kickdown switch. It is checked whether the triggering conditions are considered fulfilled. The first triggering condition is considered fulfilled since the upper speed limit $v_{lim}$ of 50 km/h is below the maximum allowable vehicle speed $v_{max}$. However, since the depression lasted for less than three seconds, the second triggering condition is not considered fulfilled. No request for an increase of the maximum power available from the powertrain is made, and the emergency vehicle is operated in the same way as if the kickdown switch had not been activated, i.e. the activation of the kickdown switch is ignored. No incidence report needs to be generated.

The emergency vehicle is still travelling at a vehicle speed of 49 km/h when an emergency alarm is received. The driver depresses the accelerator pedal fully for three seconds and thereby fulfills the second triggering condition. As a result thereof, the vehicle speed v is allowed to be temporarily increased above the upper speed limit $v_{lim}$ of 50 km/h. An incidence report is generated as the vehicle speed v exceeds the upper speed limit $v_{lim}$. Once the vehicle speed v again drops below the upper speed limit $v_{lim}$, the termination condition is considered fulfilled and the overriding of the speed limiter is disrupted.

The invention is of course not in any way restricted to the embodiments described above, but many possibilities to modifications thereof would be apparent to a person with skill in the art without departing from the scope of the invention as defined in the appended claims.

The invention claimed is:

1. A method for controlling driving power from a powertrain of a motor vehicle, wherein the motor vehicle comprises a kickdown switch and wherein the motor vehicle is configured so that an activation of the kickdown switch triggers a default action, the default action comprising temporarily requesting an increase of a maximum power available from the powertrain, the method comprising:
   recognizing that a speed limiter, which controls an upper speed limit at which a vehicle can operate, is active;
   comparing a current vehicle speed to a predefined speed threshold, wherein the predefined speed threshold is less than the upper speed limit associated with the speed limiter; and
   in response to: (i) activation of the kickdown switch, (ii) the current vehicle speed being above the predefined speed threshold, (iii) the speed limiter being active, and (iv) a triggering condition being fulfilled, triggering an altered action, wherein the altered action comprises allowing the vehicle speed to be increased above the upper speed limit by temporarily overriding the speed limiter without deactivating the speed limiter, such that the speed limiter does not control the vehicle to limit the speed of the vehicle to the upper speed limit during a kickdown operation.

2. The method according to claim 1, wherein, in response to the triggering condition not being fulfilled, the method further comprises ignoring the activation of the kickdown switch.

3. The method according to claim 1, wherein the triggering condition is defined so that it is considered fulfilled upon receipt of a defined signal generated on an initiative of a driver of the motor vehicle.

4. The method according to claim 1, wherein the triggering condition is defined so that it is considered fulfilled when the kickdown switch is activated for at least a preset time.

5. The method according to claim 1, further comprising:
   in response to a termination condition being fulfilled, allowing the speed limiter to prevent the vehicle speed from being increased above the upper speed limit.

6. The method according to claim 1, wherein the upper speed limit is less than a maximum allowable speed limit of the speed limiter, which maximum allowable speed limit is set based on a vehicle type.

7. The method according to claim 1, wherein the predefined speed threshold is set in dependence on the upper speed limit.

8. The method according to claim 1, wherein a difference between the upper speed limit and the predefined speed threshold is either less than 10 km/h or less than 5 km/h.

9. A computer program product comprising computer program code stored on a non-transitory computer-readable medium, said computer program product used for controlling driving power from a powertrain of a motor vehicle, wherein the motor vehicle comprises a kickdown switch and wherein the motor vehicle is configured so that an activation of the kickdown switch triggers a default action, the default action comprising temporarily requesting an increase of a maximum power available from the powertrain, said computer program code comprising computer instructions to cause one or more control units to perform the following operations:

recognizing that a speed limiter, which controls an upper speed limit at which a vehicle can operate, is active;

comparing a current vehicle speed to a predefined speed threshold, wherein the predefined speed threshold is less than the upper speed limit associated with the speed limiter; and in response to: (i) activation of the kickdown switch, (ii) the current vehicle speed being above the predefined speed threshold, (iii) the speed limiter being active, and (iv) a triggering condition being fulfilled, triggering an altered action, wherein the altered action comprises allowing the vehicle speed to be temporarily increased above the upper speed limit by temporarily overriding the speed limiter without deactivating the speed limiter, such that the speed limiter does not control the vehicle to limit the speed of the vehicle to the upper speed limit during a kickdown operation.

10. An apparatus for controlling driving power from a powertrain of a motor vehicle, wherein the motor vehicle comprises a kickdown switch and wherein the motor vehicle is configured so that an activation of the kickdown switch triggers a default action, the default action comprising temporarily requesting an increase of a maximum power available from the powertrain, the apparatus configured to:

recognize that a speed limiter, which controls an upper speed limit at which a vehicle can operate, is active;

compare a current vehicle speed to a predefined speed threshold, wherein the predefined speed threshold is less than the upper speed limit associated with the speed limiter; and in response to: (i) activation of the kickdown switch, (ii) the current vehicle speed being above the predefined speed threshold, (iii) the speed limiter being active, and (iv) a triggering condition being fulfilled, trigger an altered action, wherein the altered action comprises allowing the vehicle speed to be temporarily increased above the upper speed limit by temporarily overriding the speed limiter without deactivating the speed limiter, such that the speed limiter does not control the vehicle to limit the speed of the vehicle to the upper speed limit during a kickdown operation.

11. A motor vehicle comprising an apparatus for controlling driving power from a powertrain of a motor vehicle, wherein the motor vehicle comprises a kickdown switch and wherein the motor vehicle is configured so that an activation of the kickdown switch triggers a default action, the default action comprising temporarily requesting an increase of a maximum power available from the powertrain, the apparatus configured to:

recognize that a speed limiter, which controls an upper speed limit at which a vehicle can operate, is active;

compare a current vehicle speed to a predefined speed threshold, wherein the predefined speed threshold is less than the upper speed limit associated with the speed limiter; and in response to: (i) activation of the kickdown switch, (ii) the current vehicle speed being above the predefined speed threshold, (iii) the speed limiter being active, and (iv) a triggering condition being fulfilled, trigger an altered action, wherein the altered action comprises allowing the vehicle speed to be temporarily increased above the upper speed limit by temporarily overriding the speed limiter without deactivating the speed limiter, such that the speed limiter does not control the vehicle to limit the speed of the vehicle to the upper speed limit during a kickdown operation.

\* \* \* \* \*